United States Patent [19]

Schenewerk et al.

[11] 4,367,194

[45] Jan. 4, 1983

[54] EMERGENCY CORE COOLING SYSTEM

[75] Inventors: William E. Schenewerk, Sherman Oaks; Lyle E. Glasgow, Westlake Village, both of Calif.

[73] Assignee: The United States of America as represented by the United States Department of Energy, Washington, D.C.

[21] Appl. No.: 189,534

[22] Filed: Sep. 22, 1980

[51] Int. Cl.³ .............................................. G21C 9/00
[52] U.S. Cl. .................................. 376/281; 376/282; 376/372; 376/402
[58] Field of Search ............... 376/281, 282, 292, 402, 376/404, 407, 372

[56] References Cited

U.S. PATENT DOCUMENTS

| | | | |
|---|---|---|---|
| 3,425,907 | 2/1969 | Bonsel | 376/403 |
| 3,912,584 | 10/1975 | Rubinstein | 376/282 |
| 4,033,814 | 7/1977 | Bregeon | 376/407 |
| 4,035,231 | 7/1977 | Ventre | 376/282 |
| 4,280,796 | 7/1981 | Reinsch | 376/408 |
| 4,293,385 | 10/1981 | Brachet | 376/405 |

Primary Examiner—Donald P. Walsh

[57] ABSTRACT

A liquid metal cooled fast breeder reactor provided with an emergency core cooling system includes a reactor vessel which contains a reactor core comprising an array of fuel assemblies and a plurality of blanket assemblies. The reactor core is immersed in a pool of liquid metal coolant. The reactor also includes a primary coolant system comprising a pump and conduits for circulating liquid metal coolant to the reactor core and through the fuel and blanket assemblies of the core. A converging-diverging venturi nozzle with an intermediate throat section is provided in between the assemblies and the pump. The intermediate throat section of the nozzle is provided with at least one opening which is in fluid communication with the pool of liquid sodium. In normal operation, coolant flows from the pump through the nozzle to the assemblies with very little fluid flowing through the opening in the throat. However, when the pump is not running, residual heat in the core causes fluid from the pool to flow through the opening in the throat of the nozzle and outwardly through the nozzle to the assemblies, thus providing a means of removing decay heat.

16 Claims, 4 Drawing Figures

EMERGENCY CORE COOLING SYSTEM

BACKGROUND OF THE INVENTION

This invention relates generally to nuclear reactors and more particularly to a method of removing residual or decay heat from the core of a liquid metal cooled breeder reactor.

A nuclear reactor is designed and operated for the purpose of initiating and maintaining a nuclear fission chain reaction in a fissile material for the generation of heat, usually for power purposes. In the type of nuclear reactor described herein, fissile materials are contained within fuel rods or elements. A plurality of fuel elements or rods comprises a fuel assembly and a plurality of such assemblies comprises the heat generating nuclear reactor core which is structurally supported within a sealed pressure vessel. In a breeder reactor, the core also will include a fertile material contained in similar rods or elements which are combined to form an assembly. This fertile material, upon irradiation by fast neutrons, is converted to a fissile material suitable for use as fuel. A liquid metal coolant, such as liquid sodium or a mixture of sodium and potassium, is circulated into the reactor vessel and through the assemblies comprising the nuclear reactor core. There, the heat generated by nuclear fission is transferred from the fuel assemblies to the reactor coolant. The heated coolant exits from the pressure vessel and flows to a heat exchanger where the heat previously acquired is transferred by indirect heat exchange to another coolant coupled in sealing arrangement with the heat exchanger. The cooled liquid sodium exits from the heat exchanger and returns to a pump, where it is again circulated into the pressure vessel.

The system comprising the nuclear reactor core, reactor vessel, heat exchanger, circulating pump and the associated connecting piping is commonly referred to as the primary system. In a liquid metal cooled fast breeder reactor there generally is provided two or more coolant circulation loops in the primary system.

One of the accidents which must be guarded against in a nuclear reactor is a rupture of the connecting piping interconnecting a primary coolant pump and the reactor vessel. If the rupture is transverse to the axial centerline of the pipe, coolant will be discharged out of both ends of the ruptured pipe until the reactor is shut down and the pumps can be slowed down sufficiently so that no more coolant is being pumped through the ruptured pipes. Obviously, during this time, a considerable amount of coolant, normally supplied to the reactor core, is diverted out of the ruptured pipe and does not cool the core. This situation may cause extremely high core temperatures resulting in a failure of the fuel cladding and subsequent melting of the nuclear fuel contained within the core. It has been suggested that the entire system comprising the nuclear core, reactor vessel, heat exchanger, circulating pump, and connecting piping, all be contained within a housing and immersed in a pool of liquid coolant to minimize the risk of a loss-of-coolant accident.

Another potential hazard which must be guarded against is a complete loss of power. The nuclear reactors are designed such that in the unlikely event of a total power failure, the control rods will, nonetheless, automatically be reinserted into the core to shut the reactor down. The pumps have sufficient mass such that inertia of the rotating parts will continue to supply coolant long enough for full insertion of the control rods. However, even after the reactor is shut down by insertion of the control rods, the core will continue to produce heat, generally referred to as decay heat, even though the core is now subcritical. The decay heat is sufficient to produce temperatures that ultimately could melt the cladding around the fuel and perhaps even destroy the integrity of the pressure vessel.

Reactors generally are provided with an auxiliary power system, usually diesel-powered generators. However, upon starting a diesel engine, a finite amount of time is required to warm up the engine before a load can be placed upon it. Further, there is always the possibility that, for some reason, the engine will not start. Moreover, even after the diesel engine is started, the cooling pumps must be brought up to speed; and in view of the relatively large rotating masses involved, this can require a significant amount of time. During the time that the diesels are being started, warmed up, and the pumps being put back on line, the core is increasing in temperature. The temperature may be so great that fuel rod swelling and other deformation of the core could take place before the cooling system is returned to normal operation.

It has been proposed that if the reactor system is immersed in a large pool of liquid coolant, some means could be provided for cooling the core by convection currents. This, of course, requires some means for admitting the coolant from the pool into the pipes of the circulatory cooling system, either by the use of check valves or remotely controlled valves. However, these introduce yet another variable to the system in that the valves require moving parts and provide no assurance that they will work when needed. Thus, to increase the reliability of the system, redundancy is required, which, in turn, greatly enhances the cost and complexity of the system.

Obviously, there is need for an emergency core cooling system which could remove the decay heat from the reactor and which does not require the use of moving parts within the reactor vessel.

SUMMARY OF THE INVENTION

The present invention provides a liquid metal cooled nuclear reactor system having a reliable and effective emergency core cooling system. Broadly, the nuclear reactor system of the present invention comprises a vessel containing a pool of a primary liquid metal coolant. Contained in a lower portion of the vessel is a reactor core immersed in a pool of the liquid metal coolant. The core comprises an array of fuel assemblies containing a fissile nuclear material and may further include a plurality of blanket assemblies containing a fertile material. Each of the assemblies are provided with passageways for circulation of liquid metal coolant therethrough from a plenum located adjacent the bottom of the core in a lower zone of the vessel. The reactor system further includes at least one, and generally two or more, primary coolant flow systems. The primary coolant flow system includes a pump for circulating the liquid metal coolant to the plenum and through the core. At least one heat exchanger also is provided in the vessel and located at a higher elevation than that of the reactor core for receiving coolant from an upper portion of the core and returning it to the pump. A second coolant passes in indirect heat exchange relationship with the primary coolant through the heat exchanger for removing heat from the primary coolant.

The reactor of the present invention further includes a venturi nozzle intermediate the pump and the core for receiving coolant from the pump and delivering it to the core. The venturi nozzle comprises a converging-diverging section with an intermediate throat section. The throat section is provided with at least one opening which is in flow communication with the liquid metal coolant in the lower zone of the vessel.

During normal operation, the pump supplies coolant through the venturi to the core with very little fluid passing through the opening in the throat. However, when the pump is not running, the residual or decay heat in the core will cause convection currents which will draw the lower temperature coolant in the lower zone of the vessel into the opening in the throat of the venturi, where it will flow outwardly through the venturi nozzle to supply low temperature coolant to the core.

The present invention is applicable to a variety of liquid metal cooled reactors and particularly to liquid metal cooled breeder reactors wherein the reactor core comprises both an array of fuel assemblies and blanket assemblies, the latter containing a fertile material such as uranium-238 which is converted to a fissile material upon exposure to the fast neutrons from the fuel assemblies. It also will be apparent that the present invention is applicable to those reactors having a loop cooling system wherein the pump and an intermediate heat exchanger are located outside the vessel, as well as the pool-type reactor wherein the pump, heat exchanger, and core are all located inside the vessel and immersed in a pool of liquid metal.

A particularly preferred application of the present invention is to a liquid metal cooled breeder nuclear reactor system of the loop type wherein the reactor core is located in a vessel which is partitioned into upper and lower zones. The core is located in the lower zone and provided with two plenums, a high pressure plenum for supplying coolant to an array of fuel assemblies, and a low pressure plenum for supplying coolant to an array of blanket assemblies. A pump located outside the vessel provides coolant to two conduits, one of which leads to the high pressure plenum and the other to the low pressure plenum. The venturi means is located inside the vessel in the conduit going to the low pressure plenum such that when the pump is not running, liquid metal coolant can flow through the opening in the nozzle of the venturi, and outwardly through both ends, through the two conduits to provide coolant to both the blanket and fuel assemblies. In this preferred embodiment, the system also includes another heat exchanger located inside the vessel in the upper zone for receiving hot coolant from the core. In this heat exchanger, generally referred to as a decay heat removal heat exchanger, hot coolant from the core is cooled and returned to the lower zone of the vessel by the convection currents.

DESCRIPTION OF THE PREFERRED EMBODIMENT

Figure 1:
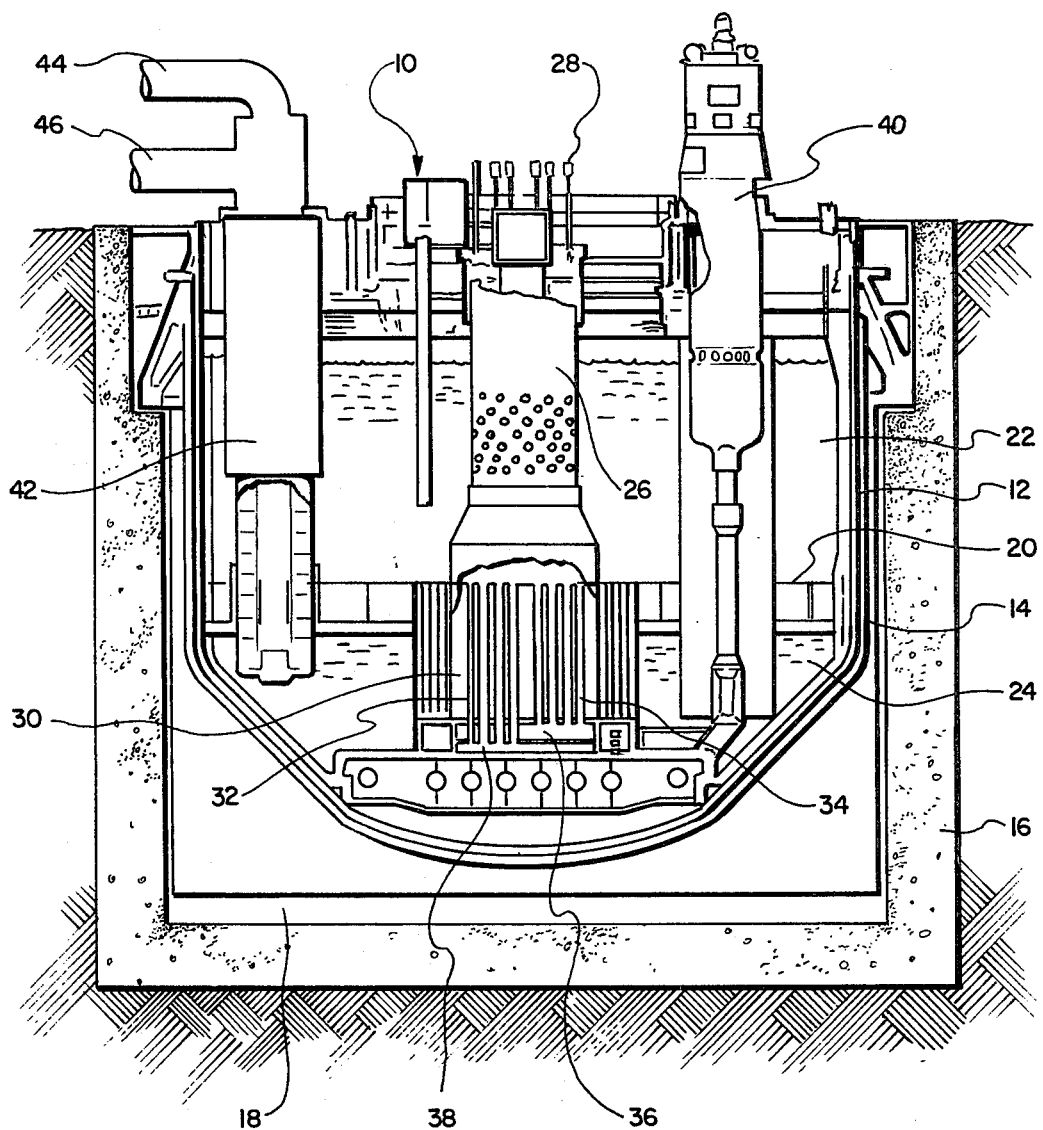
FIG. 1 is an elevation view partially in section illustrating a typical liquid metal cooled nuclear reactor of the pool type wherein the core, pump, and heat exchanger are immersed in a pool of liquid metal contained within a vessel.
Figure 2:
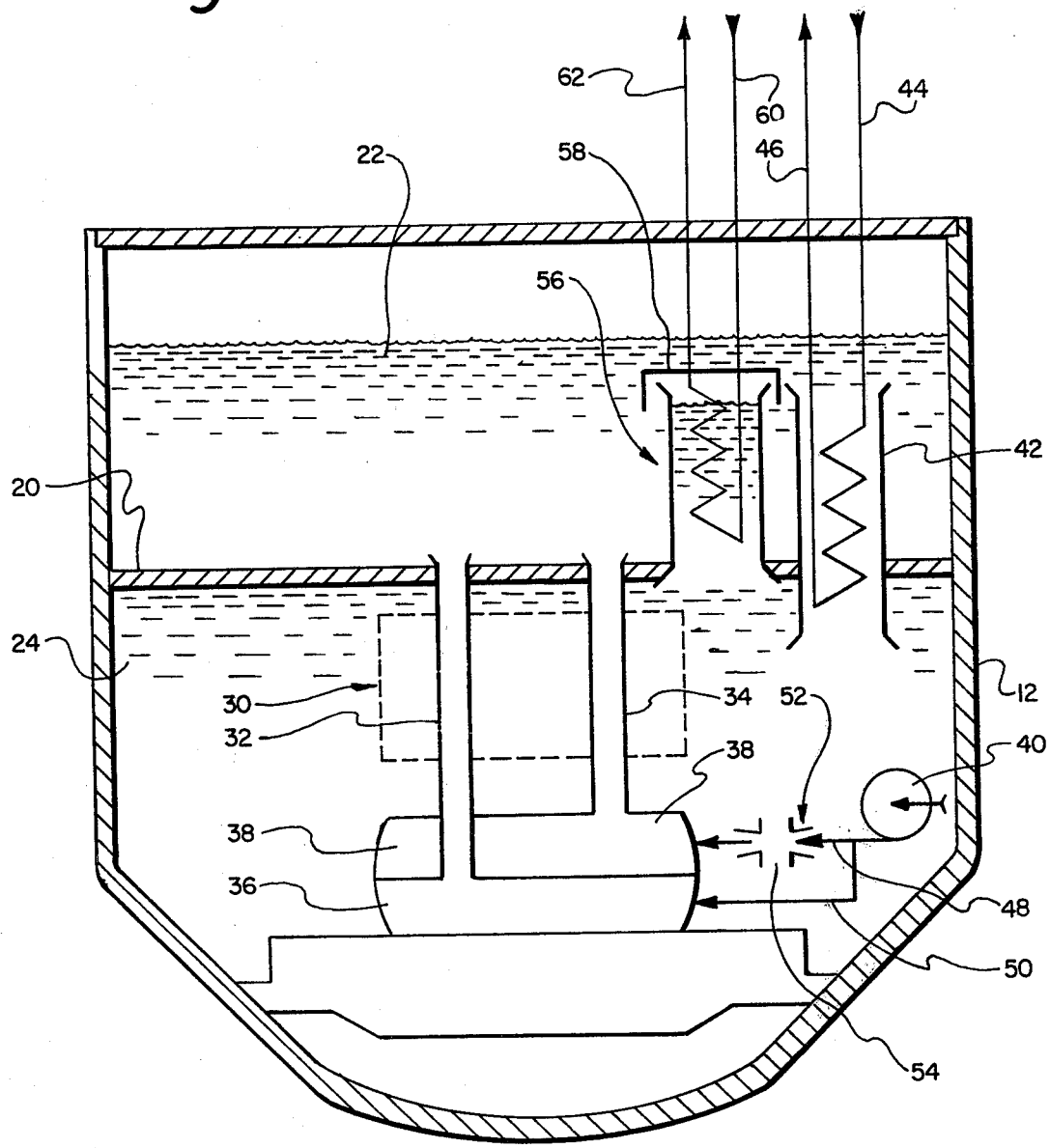
FIG. 2 is a schematic of a pool-type liquid metal cooled reactor illustrating an embodiment of the present invention.

Referring now to FIGS. 1 and 2, wherein like numbers refer to like elements, there is shown a liquid metal cooled fast breeder reactor system 10 which comprises a primary pressure vessel or tank 12 which contains a primary liquid metal coolant. Advantageously, vessel 12 is surrounded by a guard tank 14 which is, in turn, located in a concrete-lined pit 16 to minimize the possibility of any of the primary liquid metal coolant escaping to the environment in the event of a core meltdown. Concrete-lined pit 16 also may include a metal liner 18. Contained within vessel 12 is a partition 20, generally referred to as a redan, which divides the vessel into an upper zone 22 and a lower zone 24. The purpose of the partition is to define and maintain a thermocline wihtin the vessel during normal operation wherein the primary liquid metal coolant in the upper zone is maintained at a substantially higher temperature than that in the lower zone. Also located within vessel 12 is a reactor assembly 26 which is provided with a plurality of control rods 28 extending out of the vessel for regulating the degree of criticality of a core assembly 30 which is located in lower zone 24 of vessel 12. Core assembly 30 comprises an array of fuel assemblies which are provided with fluid passageways to permit the flow of coolant from lower zone 24 through the core and into upper zone 22. In the case of a breeder reactor, the core assembly also includes an array of blanket assemblies 34 containing a fertile material which is convertible to fissile material upon exposure to radiation. Blanket assemblies 34 also are provided with fluid passageways for the flow of coolant from lower zone 24 upwardly through the core to upper zone 22. In the system depicted, reactor assembly 26 is provided with a high pressure plenum 36 and a low pressure plenum 38 adjacent a bottom portion of core assembly 30. High pressure plenum 36 supplies coolant to at least a majority of the fuel assemblies 32, which are the principal heat-producing assemblies, while the low pressure plenum 38 supplies a lesser amount of coolant to blanket assemblies 34.

Reactor system 10 is provided with at least one, and generally from two to four, primary coolant systems, each of which systems comprise a heat exchanger 42, and a pump 40, for circulating liquid metal coolant from said lower zone to the plenum through core assembly 30 and heat exchanger 42 from which it flows back into lower zone 24. Heat exchanger 42 also is provided with an inlet 44 and an outlet 46 for passing a secondary coolant therethrough in indirect heat exchange relationship with the primary coolant for the recovery of heat therefrom.

Referring now to FIG. 2 in particular, therein is illustrated an embodiment of the present invention. Specifically, pump 40 discharges into two conduits 48 and 50 which provide fluid communication to low pressure plenum 38 and high pressure plenum 36, respectively. Located in conduit 48, there is provided a venturi means 52 of the present invention. Venturi means 52 comprises a converging-diverging nozzle with an intermediate throat section having at least one opening 54 which is in flow communication with the liquid metal coolant in lower zone 24 of vessel 12. In the embodiment depicted, the venturi nozzle can supply the function of reducing the pressure and flow of liquid metal coolant supplied to low pressure plenum 38 as well as providing for decay heat removal. This will be explained more fully hereafter.

In accordance with this particularly preferred embodiment, reactor system 10 includes a special heat exchanger assembly 56, sometimes referred to as a decay heat removal heat exchanger (DRHX). The advantage of having a DRHX is, of course, that when the reactor is shut down and only the decay heat must be removed, the amount of secondary coolant which must be passed or pumped to remove that heat is substantially less than that required for normal operation through the primary system heat exchanger. Thus, a much smaller pump can be used which can be brought on line far more rapidly than the large pumps required for normal operation. Advantageously, this special decay heat removal heat exchanger 56 is provided with means for preventing the flow of coolant therethrough during normal operation. In the particular embodiment depicted, this is accomplished by having a cover over the heat exchanger which extends down over the sides. A gas from a source not shown is pumped into heat exchanger 56 and trapped under cover 58, thus forming a vapor lock and preventing the flow of primary coolant therethrough during normal operation of the system. When pump 40 is not operational, the gas trapped under cover 58 is vented, permitting primary coolant to flow up under cap 58 and into decay heat removal heat exchanger 56.

During the normal operation of this reactor system, pump 40 withdraws low temperature coolant from lower zone 24 and passes it through conduits 48 and 50. The coolant flows through conduit 50, which is relatively unobstructed, into fuel assemblies 32 where it absorbs heat from the reactor core assembly 30 before being discharged into upper zone 22. The coolant flowing through conduit 48 passes through venturi means 52. The pressure differential across venturi means 52 causes a small amount of coolant to also be drawn in through opening 54 prior to the coolant entering the low pressure plenum 38 for distribution to blanket assemblies 34 which coolant also is discharged into upper zone 22. As a result of the pressure drop across venturi means 52, a substantially lesser amount of coolant passes through blanket assemblies 34. The majority of coolant from pump 40 goes through fuel assemblies 32 where the major amount of heat is being generated. The hot coolant in upper zone 22 flows through heat exchanger 42 where it passes in indirect heat exchange relationship with a secondary coolant introduced through inlet 44 of heat exchanger 42, the heated secondary coolant being withdrawn through an outlet 46. The cooled primary coolant flows downwardly through heat exchanger 42 and is returned to lower zone 24 for recirculation through pump 40.

When pump 40 is not operational for whatever reason and it is necessary to remove decay heat, the coolant in the passageways of fuel assemblies 32 and blanket assemblies 34 are heated by the residual heat contained in these assemblies, causing it to rise upwardly into zone 22. This, of course, results in convection currents which draw the lower temperatuare coolant from lower zone 24 into opening 54 of venturi means 52. Therein, it flows outwardly to both the high and low pressure plenums. Since the fuel assemblies havea greater amount of residual or decay heat, the major amount of convection flow is through these assemblies. The hot coolant exiting the assemblies into upper zone 22 now flows through the decay heat removal heat exchanger 56. This heat is removed by passing in indirect heat exchange relationship with a decay heat removal fluid which enters heat exchanger 56 via an inlet 60 and exits through an outlet 62. It will be appreciated that if there were sufficient volume of fluid contained in zones 22 and 24, a decay heat removal heat exchanger would not be necessary. However, the volume of coolant that would be required is so great as to be economically unattractive.

Figure 3:
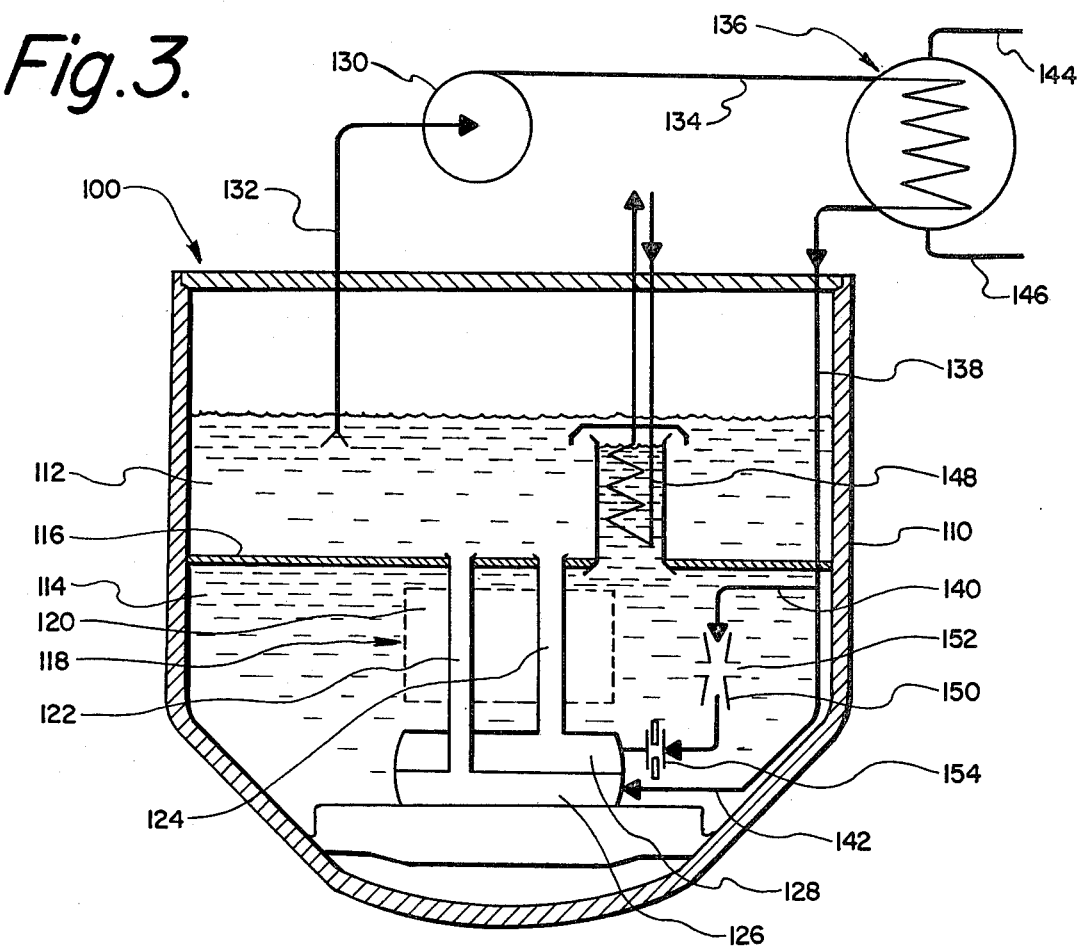
FIG. 3 is a schematic of a loop-type liquid metal cooled reactor wherein the pump and heat exchanger are located outside of the vessel containing the reactor core and illustrating another embodiment of the present invention.

Referring now to FIG. 3, therein is depicted a loop-type reactor system 100 comprising a vessel 110, which also is partitioned into an upper zone 112 and a lower zone 114 by a thermally insulating partition or redan 116. Also contained within vessel 110 is a body of a primary liquid metal coolant which substantially fills both zones. Reactor system 100 includes a reactor assembly 118, located in lower zone 114. Reactor assembly 118 comprises core assembly 120, which is made up of an array of fuel assemblies 122 and blanket assemblies 124, each of said assemblies being provided with a passageway for the flow of liquid coolant therethrough. Adjacent the lower end of the assemblies, there is provided at least one plenum for the distribution of coolant to the assemblies. In the embodiment depicted, there are provided two plenums, a high pressure plenum 126 for distribution of coolant to fuel assemblies 122 and a low pressure plenum 128 for distribution of coolant to blanket assemblies 124. Reactor system 100 further includes at least one and preferably from two to four primary coolant systems. The primary coolant system includes a pump 130 located outside the vessel 110. Pump 130 is provided with a conduit means 132 for withdrawing coolant from zone 112 and a discharge conduit 134 for passing said withdrawn coolant to a heat exchanger 136. The coolant leaving heat exchanger 136 is returned to vessel 110 via a conduit 138, which branches into conduits 140 and 142, going into plenums 128 and 126, respectively. Heat exchanger 136 also is provided with an inlet 144 and an outlet 146 for passing a secondary coolant in indirect heat exchange relationship with the primary coolant passing therethrough.

In a particularly preferred embodiment, reactor system 100 further includes a decay heat removal heat exchanger 148 substantially the same as that hereinbefore described in FIGS. 1 and 2. Intermediate conduit 140 and low pressure plenum 128, there is provided a venturi means 150 having at least one opening 152 which is in fluid communication with the liquid metal coolant in lower zone 114. Though the arrangement of certain components of the primary coolant system such as the pump and heat exchanger are different than that depicted in FIGS. 1 and 2, the operation is substantially the same as that hereinbefore described. It will be noted from this particular embodiment that it also is possible to include an additional pressure reduction or control means in the conduit going to the low pressure plenum such as an orifice plate 154 to obtain a desired flow rate through blanket assemblies 124.

Figure 4:
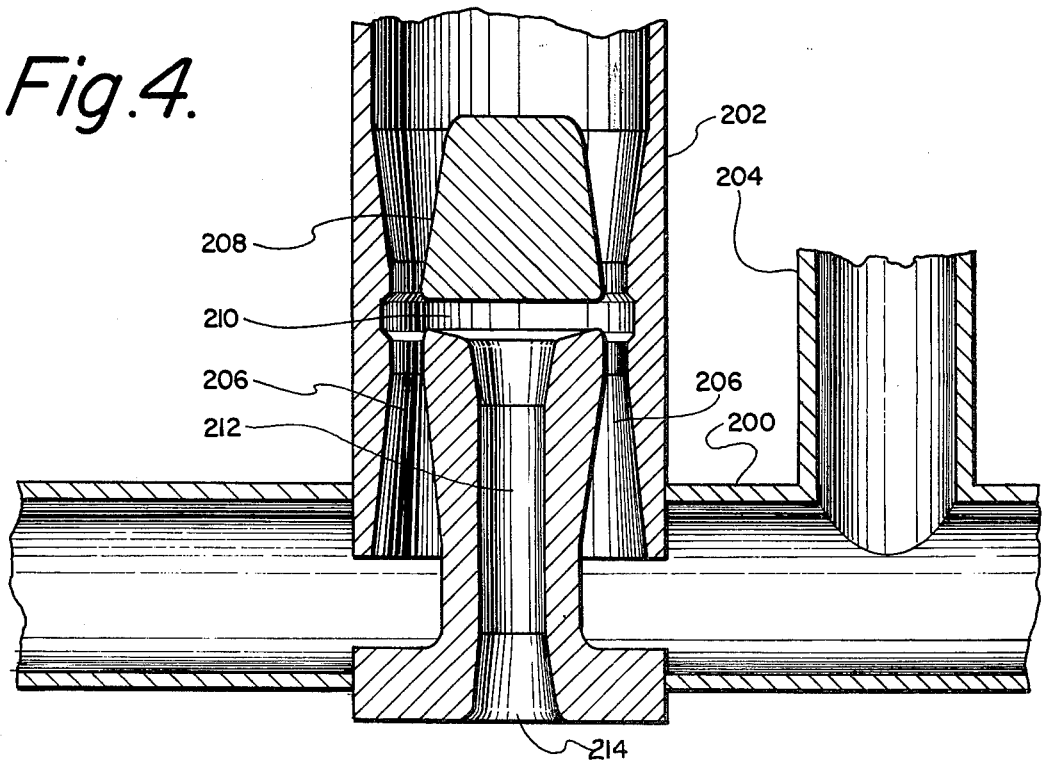
FIG. 4 illustrates an application of the present invention to a reactor which has only one plenum located beneath the core for distribution of liquid metal coolant.

Referring now to FIG. 4, therein is depicted in cross section, a broken-out section of a reactor depicting the application of the present invention to a reactor system wherein there is only one plenum for distribution of liquid metal coolant. A single plenum 200 is in fluid communication with both blanket assemblies 202 and fuel assemblies 204. Venturi nozzles 206 are formed by the inner wall of the fluid passageway in blanket assembly 202 and an inner member 208 disposed within said fluid passageway. Inner member 208 is provided with at least one opening 210 which is in fluid communication via a channel 212 with a source of low temperature coolant located outside the plenum in a lower zone 214 of a reactor vessel.

It is to be understood that the form of the invention herein shown and described is to be taken as exemplary of the same and that various changes may be resorted to without departing from the spirit or scope of the present invention. Thus, while the invention has been described with respect to a loop or pool-type reactor, other reactors using different cooling arrangements also could utilize the invention. In addition, while liquid coolants have been described specifically with respect to sodium or a combination of sodium and potassium, varioius other liquid metals also could be utilized. Further, the arrangement of the various components of the reactor could be altered without departing from the spirit of the present invention. Accordingly, the invention should not be construed in accordance with the foregoing specific description of what are now considered the best modes of practicing the invention, but rather should be interpreted in accordance with the following claims.

We claim:

1. A liquid metal cooled nuclear reactor system comprising:
    a reactor vessel;
    a pool of a primary liquid metal coolant contained within said vessel;
    a reactor core located within said vessel and immersed in said coolant, said core comprising an array of nuclear fuel assemblies containing a fissile nuclear material, each of said assemblies being provided with a passageway for the circulation of liquid metal coolant therethrough;
    a plenum adjacent a lower end of said core for the distribution of liquid metal coolant to said assemblies;
    at least one primary coolant flow system, said system including at least one heat exchanger located above said reactor core for receiving liquid metal coolant from said core and removing heat therefrom, and a pump for circulating said liquid metal coolant from said vessel through said core;
    venturi means intermediate said pump and said assemblies, and below said reactor core for receiving said liquid metal coolant from said pump and delivering it to said assemblies, said venturi means comprising a converging-diverging nozzle with an intermediate annular throat section, said throat section being provided with at least one opening in flow communication with the liquid metal coolant in the vessel whereby during normal operation the pump will supply liquid metal coolant through said venturi to the assemblies with very little coolant going through the opening in the throat; and when the pump is not running, the residual heat in the core will cause convection currents which draw the liquid metal coolant into the opening in the throat of the venturi means where it will flow outwardly through the venturi to supply coolant to the assemblies.

2. The system of claim 1 wherein said vessel is partitioned into an upper and lower zone and said reactor core is located in the lower zone.

3. The system of claim 1 wherein the reactor core further includes an array of blanket assemblies containing a fertile material and there are provided two plenums adjacent the bottom of the core, a high pressure plenum for providing coolant to the fuel assemblies, and a low pressure plenum for providing coolant to the blanket assemblies.

4. The system of claim 3 wherein said pump provides coolant to two conduits, one of the conduits going to the high pressure plenum and one of the conduits going to the low pressure plenum, and said venturi means is located intermediate the pump and the low pressure plenum.

5. The system of claim 4 wherein the pump is located within the vessel and immersed in the liquid metal coolant in the lower zone of said vessel.

6. The system of claim 4 wherein the pump is located outside the vessel.

7. The system of claim 4 wherein there are provided two heat exchangers, one for removing heat from the liquid coolant during normal operation when pumps are running and another which is located inside the vessel and through which coolant flows only when the pump is not running, both of said heat exchangers being at a higher elevation than the reactor core.

8. The system of claim 4 wherein said liquid metal coolant comprises sodium.

9. The system of claim 4 wherein said coolant comprises a mixture of sodium and potassium.

10. The system of claim 5 wherein there are provided two heat exchangers, both of which are located at an elevation above the reactor core and both are located inside the vessel and immersed in a liquid alkali metal coolant, and further including means for passing said liquid alkali metal coolant through one of said heat exchangers during normal operation when the pump is running and causing said liquid alkali metal coolant to flow through the other of said heat exchangers when said pump is not running.

11. A nuclear reactor system comprising:
    a reactor vessel partitioned into upper and lower zones;
    a primary liquid metal coolant comprising a pool of liquid metal which substantially fills both of said zones, the pool of liquid metal in the lower zone being maintained at a lower temperature than that in the upper zone during normal operation of the reactor;
    a reactor core located in said vessel and comprising an array of fuel assemblies containing a fissile nuclear fuel and a plurality of blanket assemblies containing a fertile material, each of said assemblies being provided with passageways for the circulation of liquid metal coolant therethrough from the lower zone of the vessel to the upper zone;
    at least one plenum located in said reactor vessel below the core for distribution of liquid metal coolant to said assemblies;
    at least one primary coolant flow system, said system including a heat exchanger located above the reactor core for receiving coolant from the upper zone of said vessel and a pump for circulating said liquid metal coolant through said plenum, core, and heat exchanger; and venturi means located in the lower zone of said vessel, intermediate said pump and blanket assemblies for receiving coolant from said pump and delivering it to said blanket assemblies, said venturi means comprising a converging-diverging nozzle with an intermediate annular section, said throat section being provided with at least one opening in flow communication with the liquid metal coolant in the lower zone of said vessel whereby during normal operation, the pump will supply liquid metal coolant through said venturi to the blanket assemblies with very little fluid going through the openings in the throat, and when the pump is not running, the residual heat in the core will cause convection currents which will draw the lower temperature coolant from the lower zone through the opening in the venturi throat and into the reactor core.

12. The system of claim 11 wherein there are provided two plenums adjacent the bottom of the core, a high pressure plenum for providing coolant to the fuel assemblies and a low pressure plenum for providing coolant to the blanket assemblies.

13. The system of claim 12 wherein said pump provides coolant to two conduits, one of the conduits going to the high pressure plenum and one of the conduits going to a low pressure plenum, and said venturi means is located in the conduit going to the low pressure plenum.

14. The system of claim 13 wherein the pump is located outside the vessel.

15. The system of claim 14 wherein there are provided two heat exchangers, one for removing heat from the liquid metal coolant during normal operation when said pump is running and another which is located inside the vessel and through which coolant flows only when the pump is not running, both of said heat exchangers being at a higher elevation than the reactor core and said first-mentioned heat exchanger being at a higher elevation than the other heat exchanger.

16. The system of claim 15 wherein said liquid metal coolant is liquid sodium.

* * * * *